Patented July 10, 1928.

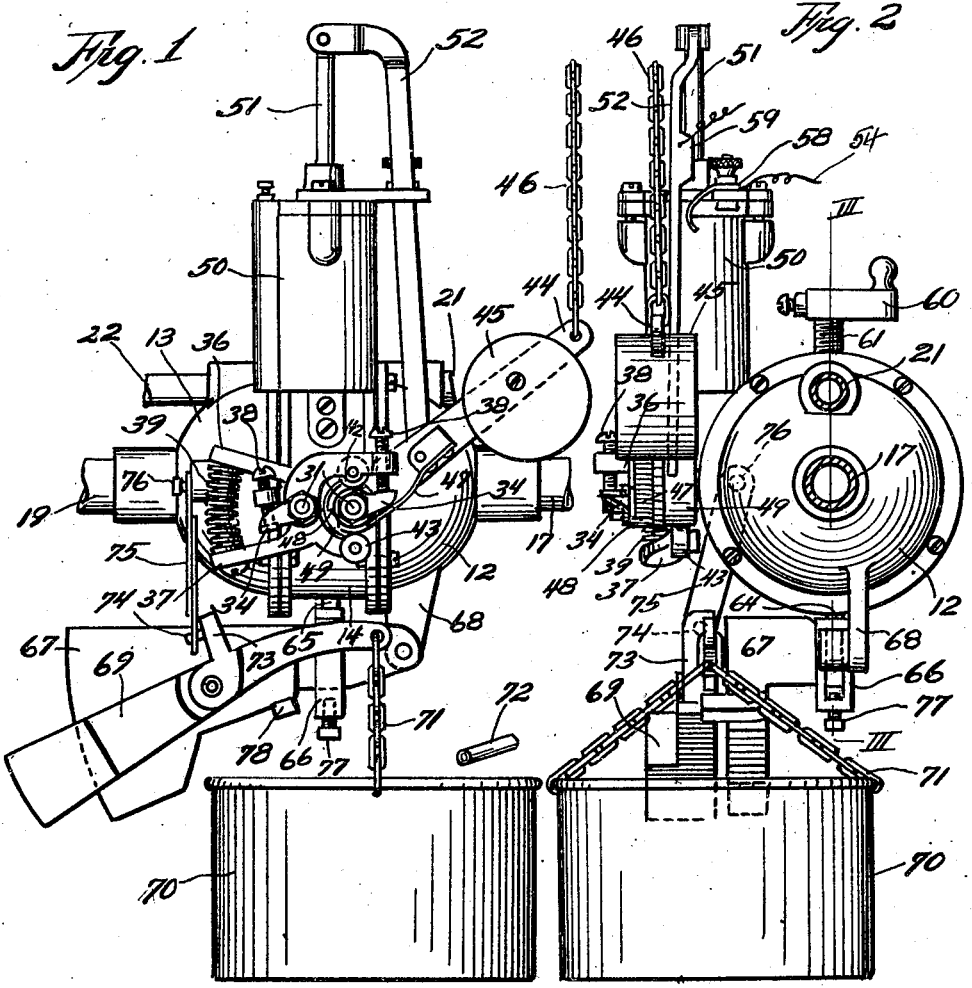

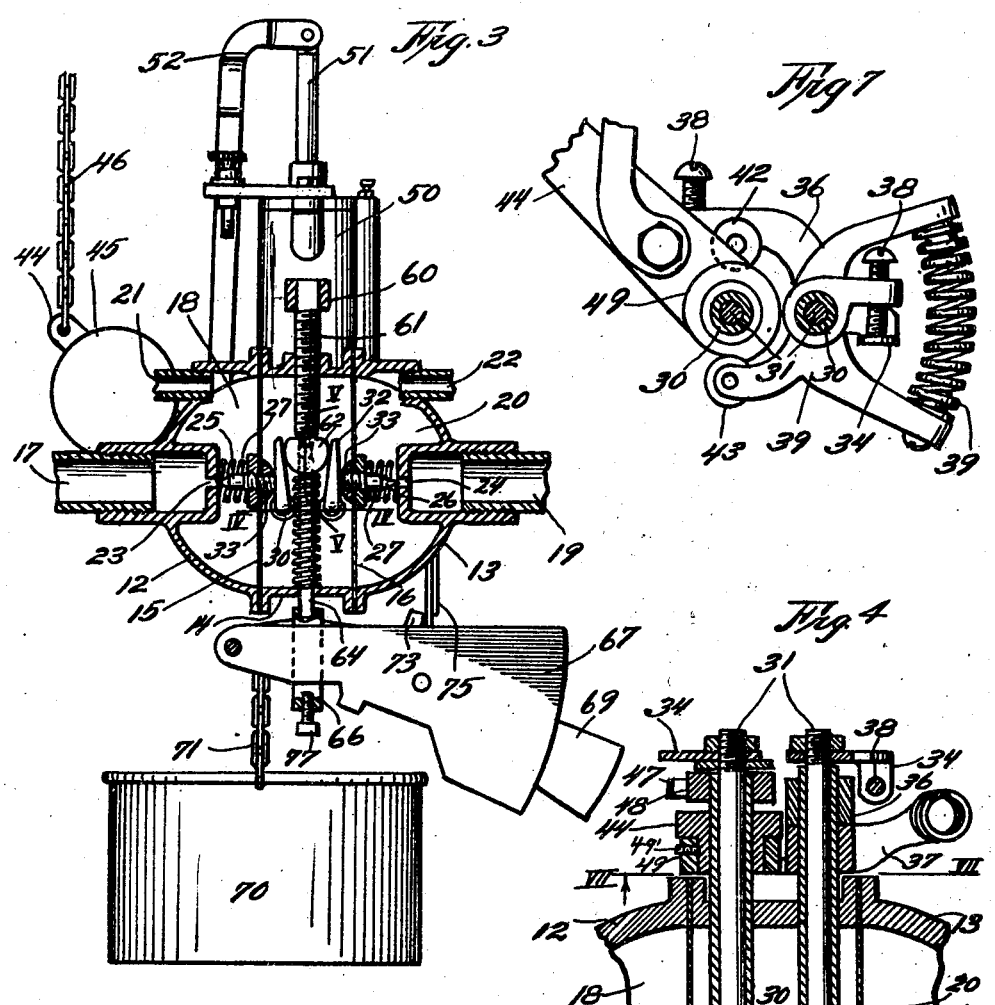
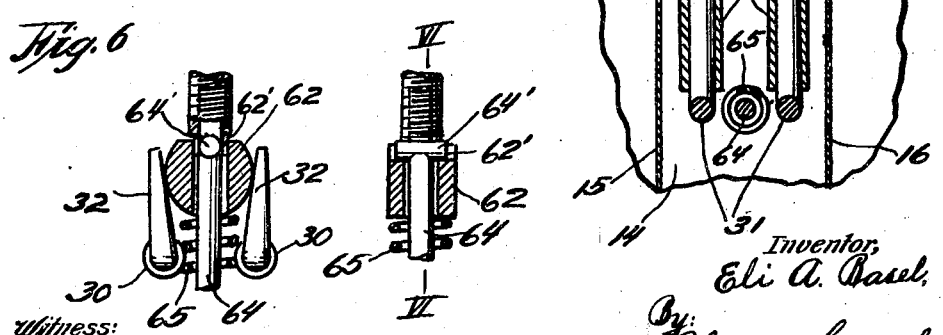

1,676,764

UNITED STATES PATENT OFFICE.

ELI A. BASEL, OF KANSAS CITY, MISSOURI.

CONTROLLING MEANS FOR MULTIPLE FUEL BURNERS.

Application filed November 26, 1923. Serial No. 677,146.

The present invention relates to valve controlling devices for regulating the fuel supply to burners, and has for its principal object the provision of a novel controlling mechanism for regulating the supply of two or more different kinds of fuel to burners, and to carry out such regulation either manually, or automatically.

It is also a special object of the invention to provide an improved automatic cut-off device adapted for automatic operation in response to the weight of oil overflowing from the burner to close all the valves supplying fuel to the burner, independently of any other manual or remote-control means which may be provided for the ordinary regulation of the burner's operation.

For embodying the proposed improvements, I provide a valve structure through which a pair of separate fuel passages are formed for supplying two different kinds of fuel to the burner, together with separate and independent valves for controlling the flow of fuel through said passages, and suitable means for controlling the positions of these valves in response to either a manual controlling device or automatic or remote-control devices, and also an automatic safety cut-off device operating independently of any of the other controlling means. In the form of construction herein illustrated, the valves are arranged in connection with suitable diaphragms in a valve casing having the necessary independent fuel passages, which diaphragms are controlled to maintain the valves normally closed, but adapted to be actuated in response to the action of the controlling mechanism for opening the valves to the proper extent and in the desired sequence, according to the requirements of the burner's operation.

It is further desired to devise a valve structure especially adapted for controlling the supply of both oil and gas to the burner, and having means for controlling the operation of the oil and gas valves for opening the gas valve prior to the opening of the oil valve, and thereafter permitting automatic closing of the gas valve while maintaining the oil valve open for the purpose of feeding oil alone to the burner. In this connection, means is also provided for automatically closing an electric ignition circuit by the valve-opening movement of the valve-controlling mechanism, for the purpose of igniting the gas which is admitted to the burner by the opening of the gas feeding valve.

It is further sought to provide, in connection with the remote-control connection for operating the duplex valve structure, a retarding device operating to retard the valve-opening movement of the valve-regulating means, in order that the supply of fuel may not be admitted to the burner so abruptly as to flood its operation.

In the construction of the automatic safety cut-off device, it is preferred also to include a fusible connection adapted to permit operation of the cut-off device in the case of a fire in the vicinity of the valve being hot enough to melt this fusible connection, and thereby close the burner valves through the medium of the same valve-closing connections as are operated by the weight of oil overflowing from the burner, as above referred to.

With the foregoing general objects in view, the invention will now be described by reference to the accompanying drawings illustrating an efficient and practical form of embodiment of the same, after which those features deemed to be novel will be particularly set forth in claims.

In the drawings:

Figure 1 is a front elevation illustrating a valve and valve-controlling construction embodying the present improvements;

Figure 2 is a front elevation of the same;

Figure 3 is a vertical sectional view, representing a section taken on the line III—III of Figure 2;

Figure 4 is an enlarged detail section taken on the line IV—IV of Figure 3;

Figure 5 is an enlarged detail section taken on the line V—V of Figure 3;

Figure 6 is a similar view representing a section on the line VI—VI of Figure 5;

Figure 7 is a detail section taken on the line VII—VII of Figure 4;

Figure 8 is a detail elevation of the parts in Figure 7, as seen from the front of the burner; and Figure 9 is a diagram illustrating the electric ignition circuit adapted to be controlled by the operative movements of the improved valve-controlling mechanism.

Referring now to the drawings in detail, these illustrate the improved valve construction as comprising a sectional valve casing made up of two outer casing sections 12, 13, of substantially semispherical form, and an intermediate substantially cylindrical section 14 clamped between sections 12 and 13, and maintaining a pair of flexible or resilient diaphragm partitions 15, 16, in adjacent parallel relation, as illustrated in Figure 3. By this means, separate fuel passages are provided in the valve casing structure, for accommodating different kinds of fuel, as for example, gas, which may be admitted from a gas supply pipe 17 into the fuel passage 18 inside the casing section 12, whereas oil, for example, admitted from an oil supply pipe 19 may be received in the fuel passage 20 inside the casing section 13, from which sections feed pipes 21 and 22 may be suitably arranged for feeding the gas and oil, respectively, to the burner (not shown).

The fuel is designed to be admitted into the passages 18 and 20 through interior valve ports 23 and 24, respectively, which are controlled by valves 25 and 26, respectively, carried by the diaphragms 15 and 16, respectively, the arrangement being such that the diaphragms tend to maintain the valves normally in open position, which action of the diaphragm is reinforced by means of coil springs 27 suitably arranged around the valves and between the diaphragms and valve ports 23 and 24, as clearly illustrated in Figure 3.

The mechanism for maintaining the valves yieldingly closed, and permitting the required opening movements of the same, will now be described. In the valve casing section 14 is mounted a pair of bearing sleeves 30 (see Figure 4), for accommodating the shaft portions 31 of a pair of crank arms 32 formed on the inner ends of said shaft portions and extending upright intermediate the central portions of the diaphragm members 15 and 16, in position for engagement with knobs or bosses 33 secured to the valve stems on the inner faces of said diaphragm. The outer end of each of the shaft portions 31 has fixedly secured thereto a stop finger 34 (see Figures 1 and 4). On one of the bearing sleeves 30 (the one at the left in Figure 1) is journaled a pair of oppositely-acting rocker arms 36, 37, each provided with suitable stop screws 38 for adjustabe engagement with the stop fingers 34, for the purpose of limiting the movement of the rocker arms in response to the action of a coil spring 39 interposed between corresponding ends of said rocker arms, as clearly shown in Figures 1 and 7. The action of this spring is of course to rock the crank arms 32 in opposite outward directions adapted to maintain the valves closed against the action of the springs 27, which valve-closing tendency of the spring 39 is adapted to be conveniently regulated by suitable adjustment of the screws 38, in an obvious manner.

The opposite ends of the rocker arms 36 and 37, that is, the ends opposite the coil spring 39, are provided with suitable rollers 42 and 43, respectively, to be operated by the movements of an arm 44 journaled upon the right-hand sleeve 30 in Figure 1, and carrying a counter-weight 45 and also provided with a remote-control chain 46, which latter may be operated either manually or automatically by the action of a thermostat in a manner well understood. The inner end of the arm 44 carries a leaf spring 47, the free end of which is adapted for successive engagement with the raised portions of a segmental cam 48 journaled upon the same sleeve 30 as the arm 44, for rotating said cam into lifting engagement with the roller 42 on the rocker arm 36, whereby the tension of the spring 39 is relaxed as regards its action on the stop finger 34 corresponding to the valve 25. The segments of the cam 48 are so divided as to result in the operative downward movement of the arm 44 not only opening the valve 25 but also permitting the same to be closed before the downward movement of the arm 44 is completed, this result being accomplished by the roller 42 dropping into the next succeeding depression on the cam member 48. The other roller 43, on the rocker arm 37, is operated by engagement with a cam bushing 49 secured by a clamp screw 49' (Figure 4) to the hub portion of the operating arm 44, and of such a contour as to allow the valve 26 to be entirely closed by the action of the spring 39 in the raised position of the arm 44, but tending to initiate opening movement of said valve after the gas valve 25 has been partially opened, and thereafter to increasingly open the oil valve 26 during the remainder of the lowering movement of the arm 44, this result being accomplished by relaxing the tension of the spring 39 as applied to the valve 26 through the screw 38 and stop finger 34 corresponding to that valve. It is also apparent that, by loosening said screw 49' and adjusting the position of the cam bushing 49, the opening of the valve 26 may be appropriately timed relative to the operation of the valve 25, to suit different conditions or requirements.

Obviously, the opposite or upward movement of the arm 44 will result in simply the reverse of the above stated steps of operation, and ending with the valves left in completely closed position, as at the beginning.

It is also preferred to provide the operating lever 44 with a retarding device, designed to retard the downward or valve-opening movement of the same, this device comprising a dash-pot cylinder 50 provided with a plunger rod 51 which is connected by a link 52 with the arm 44. The construction and operation of this retarding device is in all respects substantially identical with that in my co-pending application Serial No. 599,400, filed November 6, 1922.

In order that the movements of the operating arm 44 may also control automatically the ignition operation of the burner, I propose to provide an ignition sparking device 53 at the burner's location, this spark plug being in an electric circuit 54 including a suitable battery 55 (see Figure 9), vibrator 56 and condenser 57, together with circuit-closing contacts, one of which contact elements 58 is mounted and suitably insulated on the cylinder 50, while the other contact element 59 is formed as a part of the link 52 (see Figure 2). It is thus apparent that the downward movement of the link 52, corresponding to the same movement of the lever arm 44 will engage the contact element 59 with the other contact element 58, and thereby automatically close the ignition circuit through the sparking device 53 for the purpose of igniting the gas at the burner.

In addition to the remote-control means for operating the valves, as above described, I also provide a manually operable device comprising a hand lever 60 (see Figure 2), on the upper end of a screw 61 threaded through the top of the intermediate casing section 14, and engaging at its lower end a spreader element 62 (see Figures 5 and 6) mounted between the crank arms 32 and hence operable to rock the latter in a direction to close the valves when actuated downwardly by the operation of the screw 61.

The spreader element 62 also forms a part of an automatic safety cut-off mechanism for automatically closing the valves in the case of fire or in the event of oil overflowing from the burner, due to extinguishment of the burner flame or other cause. The element 62 is mounted upon the upper end of a rod 64 extending up through the bottom of the casing section 14 and having its upper end telescopingly received within the lower end of the screw 61. Around the rod 64 is mounted a coil spring 65 having its lower end resting against the bottom of the casing section 14, and thereby yieldingly supporting the element 62 in raised position and without any operative effect upon the arms 32. The lower or outer end of the rod 64 carries a loop 66 through which extends one of the members of the cut-off device comprising a weighted arm 67 pivotally connected to a lug 68 projecting downward from the section 12 of the valve casing. Pivoted to an intermediate portion of the arm 67 is a second weighted arm 69 adapted to be balanced by the weight of a receptacle 70 connected by a chain or the like 71 to the lighter end of the arm 69, in position to receive any oil overflowing from the burner, as by way of an overflow pipe 72. Projecting upward from an intermediate point on the arm 69 is a finger 73 carrying a projection 74 adapted for detachable engagement with one end of a link 75 of suitable fusible material, the other end of which is secured in any effective manner, as by a screw 76 to a fixed point on the valve casing section 13, as illustrated in Figure 1. The arrangement is such that the arm 69 will balance the empty receptacle 70, and the link 75 will support the parts in raised position with the arm 67 in the upper portion of the loop 66. In the event of a fire in the vicinity being hot enough to melt the link 75, of course the arms 67 and 69 will both drop, and exert a sufficient pull upon the loop 66 and rod 64 to draw the spreader element 62 downward, thereby rocking the arms 32 and closing the valves, the upper end of said rod being provided with a cross head 64' seated in a transverse recess 62' in the top face of the element 62, so that any downward travel of the rod 64 will produce a corresponding movement of the element 62. On the other hand, if sufficient oil overflows into the receptacle 70 to rock the arm 69, the projection 74 will become disengaged from the link 75, and result in the same operation of closing the valves, due to the drop of both arms 67 and 69. The extent of initial free dropping movement of the weighted arms necessary to produce this valve-closing movement will be conveniently adjusted by means of a screw 77 at the lower end of the loop 66 for engagement with the lower edge of the arm 67. A stop lug 78 is also provided on the arm 67 for appropriately limiting the movement of the arm 69 relative to the arm 67 so that the weight of the receptacle 70 and any oil therein will be added to that of the arm 69 for increasing the pull on the arm 67.

The operation of the valve-controlling construction will be readily understood from the description already given, but may be briefly summarized as follows: The chain 46 connected to the arm 44 may be operated either manually, or automatically by the action of a thermostat, as already indicated, but in either event the operative or downward movement of said arm 44 is produced by the action of gravity under the influence of the weight 45, and this operative movement is made more gradual by the retarding action of the device 50 in order that the oil supply will not be fed so abruptly to the burner as to flood its operation. The initial movement of the arm 44 will partially rotate the cam element 48 and thereby momentarily lift the roller 42 and arm 38, for opening the gas valve 25, simultaneous with which operation the ignition circuit is closed through the sparking device 53 by the engagement of the contact elements 58 and 59, thus resulting in the ignition of the gas at the burner for not only heating up the burner but also bringing the oil, which is being gradually fed to the burner, to the vaporizing point. While the gas valve is still open, oil begins to flow into the burner due to the opening of the oil valve 26 by the depression of the roller 43 engaging the cam 49, and thereby rocking the lower rocker arm 37; as the arm 44 continues to drop, the oil valve is opened wider and wider, and continues to remain open even after the gas valve is closed due to the dropping of the roller 42 after riding over one of the high portions of the cam 48, the latter action of course taking place automatically. When the arm 44 is again lifted, either automatically or manually by a pull on the chain 46, the oil valve will be closed by the action of the spring 39, due to the release of the roller 43 by the cam 49, and the gas valve of course remains closed, since the spring 47 simply drags back idly over the segmental cam 48. The ignition circuit will again be momentarily closed, but without any igniting effect until the circuit is again closed by the next drop of the arm 44.

In case for any reason it should be desired to close both of the valves 25 and 26 manually and lock the same positively in closed position, this may be accomplished by turning down the screw 61 and forcing the spreader device 62 down between the arms 32. This same result may be produced automatically in the case of a fire melting the fusible link 75, or a certain quantity of oil overflowing into the receptacle 70, as in either event both of the arms 67 and 69 will drop and pull down upon the rod 64 to depress the spreader device 62, the operation in the case of overflowing oil being preceded by the rocking of the arm 69 for disengaging the projection 74 from the link 75, and thus releasing both arms 67 and 69 for the cut-off operation.

From the foregoing it will be apparent that I have devised a simple, practical and most efficient valve construction for regulating burners of the multiple fuel type, and while I have illustrated what I now regard as the preferred form of construction I desire to expressly reserve the right to make such changes and modifications as may fairly fall within the scope of the appended claims.

What I claim is:—

1. Valve mechanism for burners comprising, in combination with a pair of separate and independent fuel passages leading to the burner for feeding different fuels thereto, a separate valve controlling the flow of fuel into each of said passages, common means operating to maintain said valves normally in closed position, and valve controlling means comprising shafts provided with connections for simultaneously actuating both of said valves, and a cam element carried by one of said shafts and adapted to operate the corresponding valve in advance of the other valve, said cam element being adjustable to vary the timed relation of the operative movements of said valves.

2. Valve mechanism for burners comprising, in combination with a pair of fuel passages leading to the burner, a separate valve controlling the flow of fuel into each of said passages, valve-controlling means operative to open one of said valves prior to the other and thereafter close the first valve while maintaining the other valve in open position, and an electric circuit provided with circuit-closing means adapted to be automatically closed by the valve-opening movement of said first means.

3. A valve structure for burners comprising a casing provided with a pair of separate fuel passages, a pair of adjacent diaphragms carrying valves controlling the flow of fuel through said passages, means cooperating with said diaphragms and tending to open the valves, and mechanism operating intermediate said diaphragms for counteracting said first means to close the valves.

4. A valve structure for burners comprising a casing provided with a pair of separate fuel passages, a pair of adjacent diaphragms carrying valves controlling the flow of fuel through said passages and tending to move into open position, means acting yieldingly to maintain said valves in closed position, and valve-controlling means operating to relax the action of said first means to permit opening movement of the valves.

5. A valve structure for burners comprising a casing provided with a pair of separate fuel passages, a pair of adjacent diaphragms carrying valves controlling the flow of fuel through said passages and tending to move into open position, means acting yieldingly to maintain said valves in closed position, and valve-controlling means comprising separate adjustable means operative to relax the action of said first means and permit variable opening movement of the valves.

6. A valve structure for burners comprising a casing provided with a pair of separate fuel passages, a pair of adjacent flexible diaphragms carrying valves controlling the flow of fuel through said passages and tending to maintain said valves normally in open position, means acting yieldingly to maintain said valves in closed position, and valve-controlling means operative to relax the action of said first means successively with relation to said valves to permit opening movement of the valves in consecutive order.

7. Valve mechanism for burners comprising, in combination with a pair of fuel passages leading to the burner, a separate valve controlling the flow of fuel into each of said passages and having elements tending to open the same, yieldingly acting means provided with separate operative connections to said valves and tending to move both of the same into closed position, and valve-controlling means operating successively through said connections to relax the action of said first means and permit successive opening movement of said valves.

8. Valve mechanism for burners comprising, in combination with a pair of fuel passages leading to the burner, a separate valve controlling the flow of fuel into each of said passages and having elements tending to open the same, yieldingly acting means provided with separate operative connections to said valves and tending to move both of the same into closed position, and valve-controlling mechanism provided with means acting separately and successively through said connections to relax the action of said first means to permit successive opening movement of said valves and thereafter automatically releasing the first opening valve to the action of said first means to reclose the latter valve.

9. Valve mechanism for burners comprising, in combination with an oil passage and a gas passage leading to the burner, a separate valve controlling the flow of fuel into each of said passages and having elements tending to open the same, yieldingly acting means provided with separate operative connections to said valves and tending to move both of the same into closed position, and valve-controlling mechanism operating through the connections to the gas valve to relax the action of said first means thereon to permit intermittent opening and closing movement of said valve, said controlling mechanism including means operating through the connections to the oil valve to relax the action of said first means thereon after the opening of the gas valve and permit opening of the oil valve and maintain the latter open after the closing of the gas valve.

10. Valve mechanism for burners comprising, in combination with an oil passage and a gas passage leading to the burner, a separate valve controlling the flow of fuel into each of said passages and having elements tending to open the same, yieldingly acting means provided with separate operative connections to said valves and tending to move both of the same into closed position, valve-controlling mechanism operating through the connections to the gas valve to relax the action of said first means thereon to permit intermittent opening and closing movement of said valve, said controlling mechanism including means operating through the connections to the oil valve to relax the action of said first means thereon after the opening of the gas valve and permit opening of the oil valve and maintain the latter open after the closing of the gas valve, and an electric circuit provided with circuit-closing means automatically closed by the initial operative movement of said valve-controlling mechanism.

11. Valve mechanism for burners comprising, in combination with a pair of fuel passages leading to the burner, a separate valve controlling the flow of fuel into each of said passages and having elements tending to open the same, a pair of rocker members associated with said valves and provided with a spring element imparting oppositely acting movements to said members for separately actuating said valves into closed position, and valve-controlling means operating through said rocker members to relax the action of said spring element for permitting opening movement of the valves.

12. Valve mechanism for burners comprising, in combination with a pair of fuel passages leading to the burner, a separate valve controlling the flow of fuel into each of said passages and having elements tending to open the same, a rocker member associated with each of said valves, a spring element arranged to impart oppositely acting movements to said members and operating to separately actuate said valves into closed position, adjustable means for regulating the tension of said spring element as applied to each of said valves, and valve-controlling means operating through said rocker members to independently relax the action of said spring element with relation to each of said valves and permit separate opening movement of the latter.

13. Valve mechanism for oil burners comprising, in combination with the fuel passage leading to the burner, a valve controlling the flow of fuel through said passage, an operating member for closing said valve, an arm operative automatically under the pull of gravity to actuate said member to close the valve, a receptacle provided with a counter-balancing arm movably carried by said first arm in position to receive oil overflowing from the burner, and a supporting element detachably engaging said counter-balancing arm and thereby retaining said first arm inoperative while adapted in response to a given amount of oil received in the receptacle to release said arm to valve-closing position.

14. Valve mechanism for oil burners comprising, in combination with the fuel passage leading to the burner, a valve controlling the flow of fuel through said passage, an operating member for closing said valve, an arm operative automatically under the pull of gravity to actuate said member to close the valve, a receptacle provided with a counter-balancing arm movably carried by said first arm in position to receive oil overflowing from the burner, and a fusible link detachably supporting said arms in inoperative position while adapted to release the same for movement into valve-closed position in response either to heat sufficient to melt the link or to a given amount of oil received in said receptacle.

15. Valve mechanism for burners comprising, in combination with a pair of fuel passages leading to the burner, a separate valve controlling the flow of fuel into each of said passages, an operating member adapted to simultaneously actuate both of said valves into closed position, a manually operable device adapted to actuate said operating member, and automatic valve-operating means connected with said operating member and responsive to a given amount of oil overflowing from the burner to actuate said operating member to close the valves.

16. A valve structure for burners comprising a casing provided with a pair of separate fuel passages, a pair of adjacent diaphragms carrying valves controlling the flow of fuel through said passages, a valve-operating element intermediate said diaphragms adapted to simultaneously actuate both of said valves into closed position, a manually operable device adapted to actuate said valve-operating element, and an automatic valve-operating member connected with said operating element in telescoping relation to said manual device and adapted to actuate said operating element into valve-closing position.

In witness whereof I hereunto affix my signature.

ELI A. BASEL.